United States Patent [19]
Lea

[11] Patent Number: 5,586,170
[45] Date of Patent: Dec. 17, 1996

[54] CELLULAR DEVICES, SYSTEMS AND METHODS USING INTERCELL MACRO-DIVERSITY AND DYNAMIC CHANNEL ALLOCATION

[75] Inventor: Chin-Tau Lea, Marietta, Ga.

[73] Assignee: Georgia Tech Research Corporation, Atlanta, Ga.

[21] Appl. No.: 293,137

[22] Filed: Aug. 19, 1994

[51] Int. Cl.$^6$ ........................................... H04Q 7/22
[52] U.S. Cl. ................................ 379/60; 455/33.2
[58] Field of Search .......................... 379/58, 59, 60, 379/63; 455/33.1, 33.2, 54.1, 56.1, 34.1, 62, 67.1

[56] References Cited

U.S. PATENT DOCUMENTS

| | | | |
|---|---|---|---|
| 3,714,574 | 1/1973 | Baba et al. | 325/51 |
| 3,819,872 | 6/1974 | Hamrick | 179/41 |
| 4,355,411 | 10/1982 | Reudink et al. | 455/33 |
| 4,596,042 | 6/1986 | Stangl | 455/56 |
| 4,608,711 | 8/1986 | Goldman | 379/60 |
| 4,797,947 | 1/1989 | Labedz | 455/33 |
| 4,932,049 | 6/1990 | Lee | 379/60 |
| 4,932,050 | 6/1990 | Davidson et al. | 379/211 |
| 4,953,197 | 8/1990 | Kaewell, Jr. et al. | 379/58 |
| 5,038,399 | 8/1991 | Bruckert | 455/34.1 X |
| 5,101,501 | 3/1992 | Gilhousen et al. | 453/33 |
| 5,109,528 | 4/1992 | Uddenfeldt | 455/33.3 |
| 5,119,501 | 6/1992 | Perry et al. | 455/33.3 |
| 5,179,720 | 1/1993 | Grube et al. | 455/16 |
| 5,189,734 | 2/1993 | Bailey et al. | 379/60 |
| 5,230,082 | 7/1993 | Ghisler et al. | 455/33.2 |
| 5,263,175 | 11/1993 | Dejmek | 455/10 |
| 5,265,263 | 11/1993 | Ramsdale et al. | 455/33.2 |
| 5,303,289 | 4/1994 | Quinn | 379/60 |
| 5,428,816 | 6/1995 | Barnett et al. | 379/60 |
| 5,432,843 | 7/1995 | Bonta | 379/60 |

OTHER PUBLICATIONS

"The Cellular Concept", Bell System Technical Journal, vol. 58, No. 1, Jan. 1979, pp. 15–41, authored by V. H. MacDonald.

"Macroscope Diversity in Frequency Reuse Radio Systems", IEEE Journal on Selected Areas in Communications, vol. Sac. 5, No. 5, 1987, pp. 862–870, by Richard Bernhardt.

*Primary Examiner*—Curtis Kuntz
*Assistant Examiner*—Michael B. Chernoff
*Attorney, Agent, or Firm*—Hopkins & Thomas; Scott A. Horstemeyer

[57] ABSTRACT

A system of the subject invention includes a mobile telecommunications switching office (MTSO), several base stations and mobile units. The base stations serve respective sectors or cells to establish radio communications with mobile units in their sectors or cells. The base stations are connected to the MTSO which performs switching to establish call connections between mobile units and/or between units served by an external network to which the MTSO is connected. The MTSO uses dynamic channel allocation to designate base stations to serve a call connection in active mode and in standby mode for a particular channel. Therefore, if communication with the base station serving a call connection in active mode is disrupted by a building, terrain or an equipment failure, for example, the MTSO can set the base station currently in active mode to standby mode, and can set the base station currently in standby mode, to active mode to serve the call connection on the channel. Thus, the use of sectors or cells in active and standby modes, allows for relatively reliable communications through macro-diversity. Also, the ping-pong effect occurs relatively infrequently because the sectors or cells are switched between active and standby modes as a mobile unit moves along a sector or cell boundary, rather than requiring a handoff to another channel as required in conventional systems. Further, through use of dynamic channel allocation, handoffs in the traditional sense are relatively rare in the system of the subject invention.

10 Claims, 8 Drawing Sheets

CELLULAR DEVICES, SYSTEMS AND METHODS USING INTERCELL MACRO-DIVERSITY AND DYNAMIC CHANNEL ALLOCATION

BACKGROUND OF THE INVENTION

1. Field of the Invention

The present invention is related to cellular devices, systems and methods, and more particularly, to cellular devices, systems and methods using macro-diversity and dynamic channel allocation.

2. Description of the Related Art

Cellular telephone systems typically use several cells to serve a service area. Each cell has a base station capable of establishing radio connections with mobile units in the cell. The channels used to establish the radio connections can be implemented as a frequency division multiple access (FDMA) system in which a particular frequency carries a respective channel. Alternatively, a channel can be implemented in a time division multiple access (TDMA) channel in which a channel has a particular frequency and time slot. Code division multiple access (CDMA) systems are also used to establish channels, but these CDMA systems are not relevant to the subject invention.

The channels can be allocated to a cell in a fixed or dynamic manner. In fixed channel allocation, a cell is assigned a fixed set of channels to use for communications with mobile units in that cell. The fixed set of channels is determined to ensure that other nearby cells are not using a channel in the fixed set to avoid unacceptable levels of cochannel interference (that is, interference caused by more than one cell attempting to communicate simultaneously on the same channel). In dynamic channel allocation, a cell can use as many of the available channels as needed to serve the calls for that cell, as long as the use of any allocated channel will not cause unacceptable levels of cochannel interference from other nearby cells. Thus, because dynamic channel allocation allows a cell to adjust the number of channels used by that cell depending upon the number of calls to be served, dynamic channel allocation increases the trunking efficiency of a cellular system relative to fixed channel allocation.

Whether a conventional cellular system uses fixed or dynamic channel allocation, as a mobile unit with an established radio connection moves across a boundary between two cells, the original channel used to communicate with the mobile unit must be changed to a new channel used in the cell entered by the mobile unit. This operation of changing the channel used to communicate with the mobile unit on an established connection, is called a 'handoff'.

One problem that occurs as a mobile unit moves along the boundary between two or more cells, is that multiple handoffs can occur. The resulting processing load on the cellular system resulting from multiple handoffs can be significant. This problem is commonly known as the 'ping-pong' effect.

Another problem which has been identified in cellular systems, is the temporary interruption of a radio connection by a building or terrain, for example, interceding between a mobile unit and a base station serving the cell. One solution to this interruption of communication known as 'shadowing' is to provide more than one communication path to serve a call, a technique termed 'macro-diversity'. U.S. Pat. No. 4,932,049 applies macro-diversity within a cell (i.e., intracell macro-diversity) by using more than one base station arranged at different locations within the cell, to communicate with a mobile unit. However, because base stations are extremely expensive, using more than one base station for a cell can be an uneconomical and impractical solution to shadowing.

Another consideration important to a cellular telephone system, is the desirability of increasing the capacity of the system. To increase the capacity, a channel can be reused within a certain distance of a cell using the same channel as long as cochannel interference is below an acceptable level. This distance is called a 'reuse distance' and is usually defined as a distance at which a signal-to-interference ratio (SIR) is above a specified value.

The reuse distance can be decreased by using directional (rather than omnidirectional) antennas at base stations serving cells in a cellular telephone system. In this situation, a cell is divided into sectors corresponding to respective directional antennas. Because the directional antenna has a relatively limited transmission area, the same channel can be reused relatively nearby the directional antenna. Accordingly, the reuse distance is reduced and the capacity is correspondingly increased, in cellular telephone systems using sectoring.

Although the use of sectoring increases the capacity of a cellular telephone system, the use of sectoring also increases handoff processing because handoffs between channels are needed even as a mobile unit moves across a sector boundary. Also, the ping-pong problem is an even greater concern if sectoring is used, because there are more sector boundaries than cell boundaries, so ping-pong effects are likely to occur more frequently in cellular systems using sectoring.

SUMMARY OF THE INVENTION

The subject invention uses both intercell macro-diversity and dynamic channel allocation to achieve relatively reliable and simplified cellular communication capabilities, reduction of the frequency of handoffs required in a cellular system, reduction of occurrences of the ping-pong effect, alleviation of shadowing and improvement of the capacity of a cellular system, with relatively little expense.

More specifically, a radio connection is established on a channel between a mobile unit and a base station in a cell (e.g., by using the 'self-location scheme' as explained in U.S. Pat. No. 4,932,049 to William C. Lee, which is incorporated herein by reference). The base station in active communication with the mobile unit on a channel (i.e., transmitting signals to the mobile unit) is considered to be in active mode as to that channel. In addition to the active mode base station, the system also selects another base station as the second station to serve the same call. The selection is based on the signal strength measurement of the stations within a predetermined proximity to the cell designated to be in active mode. From among the cells within the predetermined proximity to the designated active mode cell, the base station of the cell with the strongest signal (actually, this is ideally the secondmost strong signal overall because the firstmost strong signal would be used to serve the radio connection in active mode) is designated to serve the connection in 'standby mode' if the use of the channel in that cell would not violate a reuse distance requirement and therefore require a handoff to another channel. In standby mode, the base station of the cell in standby mode does not actually transmit signals to the mobile unit, but is tuned to the channel and available to communicate with the mobile unit on the channel if needed. The sector or cell associated with a base station in standby mode, is also considered to be in standby mode.

In the subject invention, if the signal strength of the cell in standby mode becomes greater than that of the cell serving the call in active mode, the subject invention switches that cell from standby mode to active mode, and switches the other cell in active mode, to standby mode. Accordingly, only one of the cells designated to serve a connection, is in active mode at any given time.

The subject invention compares the signal strengths of the cells in standby and active modes, with a predetermined value. If either of the signal strengths falls below the predetermined value, the subject invention measures signal strengths of the channel in different cells to determine a replacement cell to serve the connection in standby mode while the other cell maintains the connection with the mobile unit in active mode. Importantly, because dynamic channel allocation is used, the same frequency (and slot number, in the case of a TDMA system) of a connection is maintained even as the mobile unit moves from cell to cell (or from sector to sector if sectoring is used), until the use of the channel violates a reuse distance requirement. When that happens, a handoff in the traditional sense is performed.

Of course, the subject invention can be readily applied to a cellular system using sectors rather than cells (and preferably, the subject invention is so applied). Also, more than one sector or cell can be used in standby mode to serve a connection with a mobile unit by designating a plurality of sectors or cells with the strongest signals measured, to serve the connection in standby mode.

Thus, the subject invention advantageously uses dynamic channel allocation not only for the usual purpose of increasing trunking efficiency, but also for the implementation of macro-diversity—that is, using two base stations to serve the same connection simultaneously. Because more than one sector or cell is used to communicate with the mobile unit, one serving in active mode and the other(s) serving in standby mode, the subject invention alleviates shadowing effects by obstruction of communications caused by a building or terrain, for example, by switching the sectors or cells designated to serve a connection between active and standby modes.

These together with other objectives and advantages, which will become subsequently apparent, reside in the details of construction and operation as more fully hereinafter described and claimed, reference being had to the accompanying drawings, forming a pan hereof, wherein like numerals refer to like pans throughout.

DESCRIPTION OF THE PREFERRED EMBODIMENTS

1. The Cellular System

Figure 1:
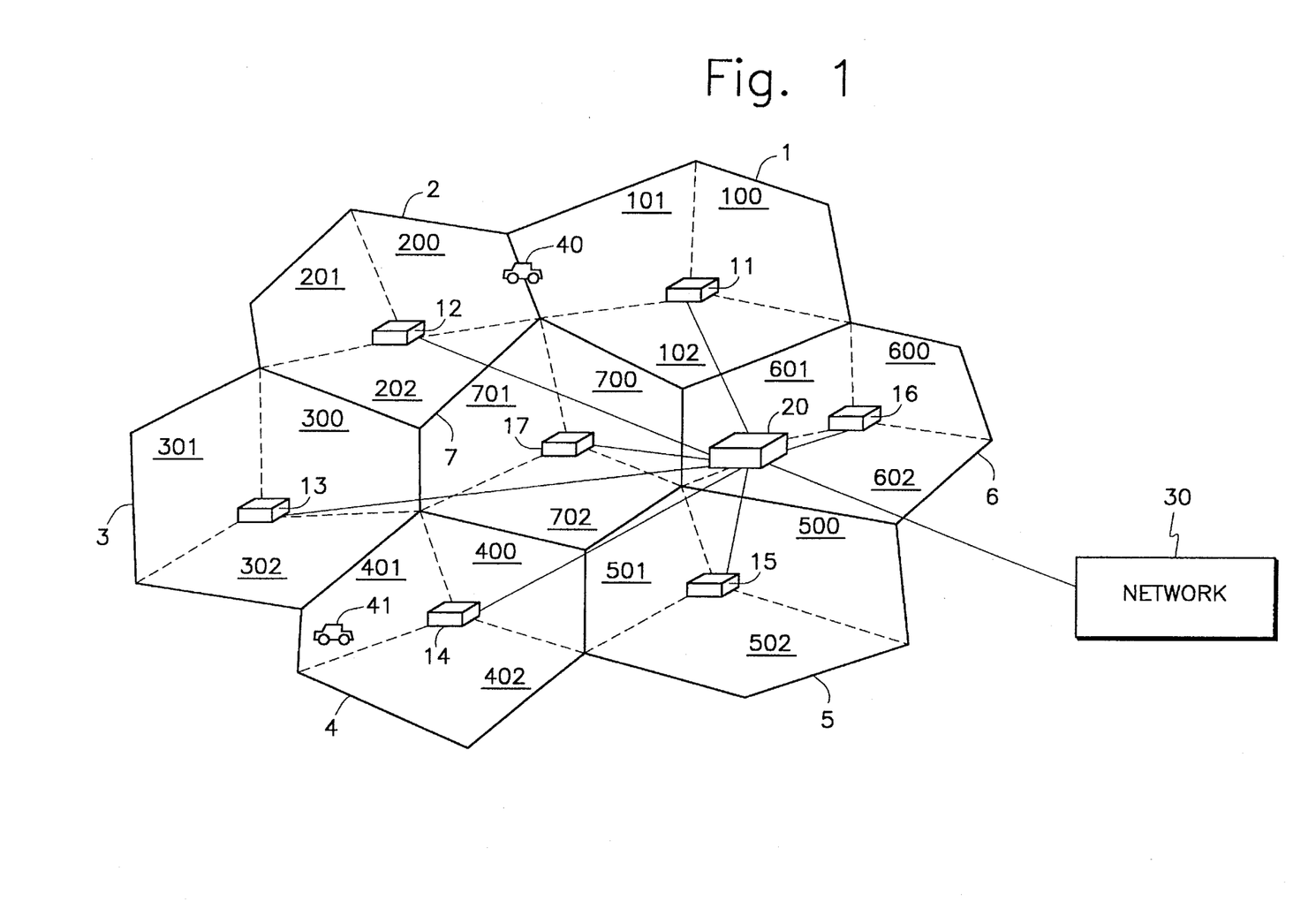
FIG. 1 is a cellular system in accordance with the subject invention.

FIG. 1 is a diagram of a cellular telephone system to which the subject invention can be applied. In FIG. 1, a service area is divided into a plurality of cells 1–7 served by respective base stations 11–17. The base stations 11–17 generally function to establish radio connections with mobile units within their respective cells 1–7 (e.g., mobile units 40, 41).

In FIG. 1, the base stations 11–17 use three directional antennas aligned to cover about 120° of arc for respective sectors 100–102, 200–202, 300–302, 400–402, 500–502, 600–602 and 700–702, as illustrated by the dashed lines in the cells 1–7. The directional antenna patterns of the sectoring scheme will confine the transmitted signal in an area of exactly the same size as a single cell (for example, the area covered by the three sectors 400, 702, and 501 has the same area as that of any cell 1–7). This means that macro-diversity implemented by the subject invention, while enhancing the received signal quality, will not increase the cochannel interference due to the fact that two stations serve one connection at any given time. Although the cellular system of FIG. 1 uses sectoring, the subject invention can be applied to a cellular system which does not use sectoring, as will be apparent to persons with a basic understanding of cellular systems. However, the use of sectoring in the subject invention is preferred to increase the capacity of the cellular system using the subject invention.

The base stations 11–17 are linked to a mobile telecommunications switching office (MTSO) 20 serving the entire service area. Basically, the MTSO 20 performs switching to establish connections between mobile units communicating with each other within the service area, and to establish connections between mobile units and units served by the network 30. The network 30 can be an existing telephone network, for example.

2. The Mobile Unit

Figure 2:
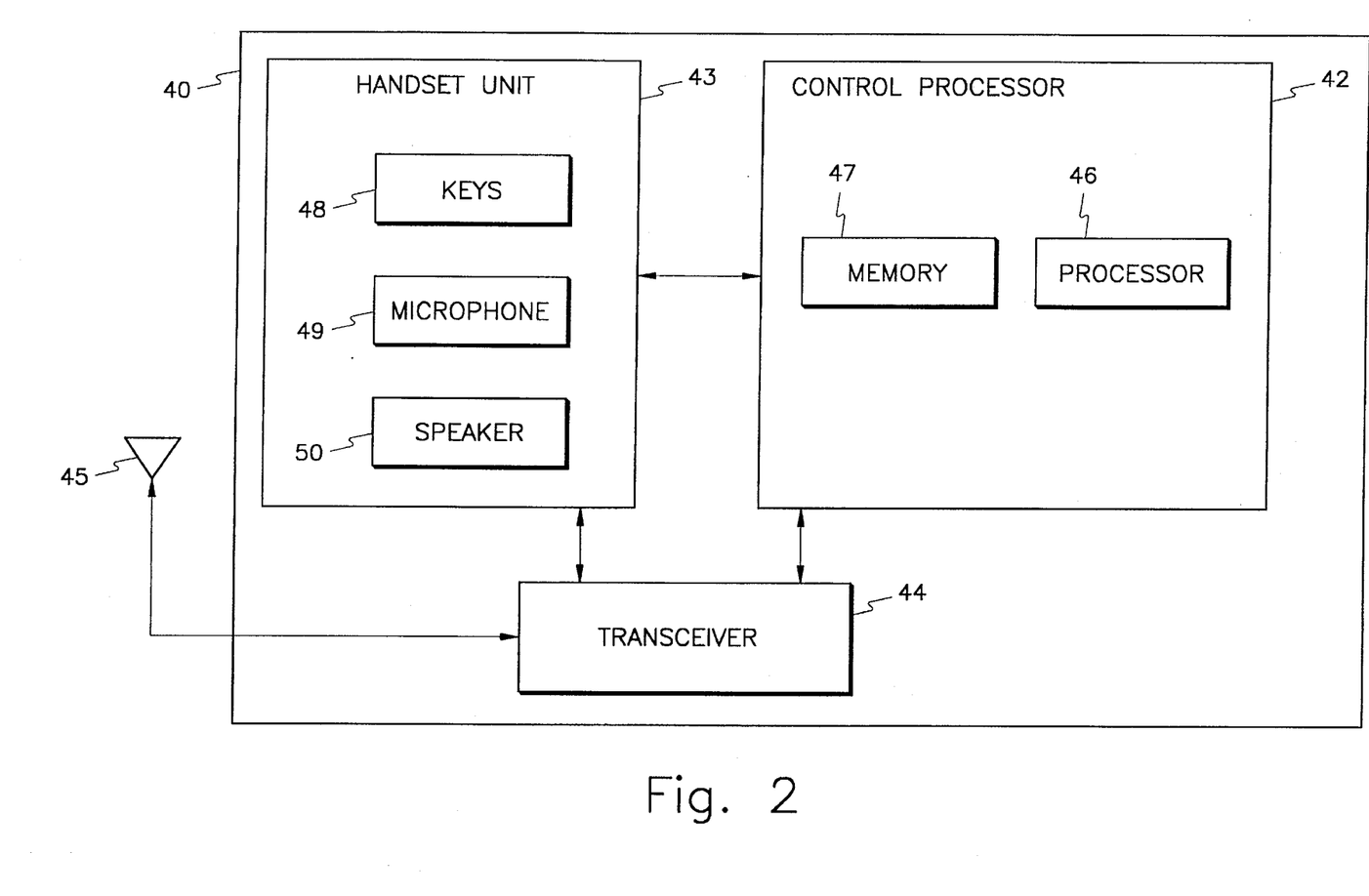
FIG. 2 is a block diagram of a mobile unit in accordance with the subject invention.

FIG. 2 is block diagram of the mobile unit 40 of FIG. 1. Because the elements included within the mobile unit 40 are similar to those included in the mobile unit 41, an explanation of the elements included in the mobile unit 41 is omitted as redundant.

Mobile unit 40 includes control processor 42, a handset unit 43, transceiver 44 and an antenna 45. The control processor 42 controls the overall operations of the mobile unit 40. The control processor 42 includes a processor 46 which can be a microprocessor, for example. The control processor 42 also includes a memory 47 to store control programs, programmed data and data obtained or generated during operation of the mobile unit 40.

The handset 43 includes keys 48, microphone 49 and speaker 50. The keys 48 are manipulated by a user to enter a call number or a command to perform a particular operation. The microphone 49 and speaker 50 serve as an audio/electronic interface for the user and the mobile unit 40.

The control processor 42 and the handset 43 are coupled to the transceiver 44. The transceiver 44 receives voice and control signals from the antenna 45, and converts the control and voice signals into formats usable by control processor 42 and the handset 43, respectively. Also, the transceiver unit 44 receives control signals generated by the control processor 42 and amplifies the control signals for transmission on the antenna 45. Further, the transceiver unit 44 receives voice signals from the handset unit 43 and amplifies these voice signals for transmission on the antenna 45 on a channel designated by the control processor 42.

When the power of the mobile unit 40 is 'on', it locks onto the strongest set-up channel and stores that information including the identity of the strongest set-up channel, in the memory 47. This locking process is updated periodically (e.g., every minute). In response to call initiation from a user or a paging message, the control processor 42 will use the strongest set-up channel currently available to lock into communication with the base station 11–17 associated with the strongest set-up channel. After a voice channel is identified by the MTSO 20, information including the identity of the voice channel will be sent back to the mobile unit 40. The processor 46 then controls the transceiver 44 to tune to the voice channel and connects the microphone 49 and the speaker 50 to the transceiver unit 44 so that the user can transmit and receive voice signals via the antenna 45. When the user hangs-up the handset 43 or the unit at the other end of the call connection hangs-up, the control processor 42 disconnects the handset unit 43 from the transceiver unit 44 and begins to monitor the signals received on the transceiver unit 44 for the unique paging message associated with the mobile unit 40.

The mobile unit 40 so far described performs the usual functions of a mobile unit. However, it can also be modified to simplify the tasks performed in the cellular system of the subject invention. For example, for the cellular system of the subject invention, the locking process which is repeated periodically (e.g., every minute) when the mobile unit 40 is not being used for a conversation, not only records in the memory 47 the strongest set-up channel, but also the second strongest set-up channel. When a call is initiated by the user or a paging message is received, the mobile unit 40 will use the strongest set-up channel to communicate with the base station. On the strongest set-up channel, the mobile unit 40 also transmits information including the identity of the base station associated with the secondmost strong set-up channel, so that the MTSO 20 can select the 'standby' mode base station immediately. In a TDMA system, a mobile unit 40 can perform power measurement even while it is communicating by using a time slot(s) other than the one used for conversation. Thus, in the TDMA system, the mobile unit 40 can be charged with the tasks of monitoring the signal strengths of active and standby mode base stations and of instructing them to switch.

3. The Base Station

Figure 3:
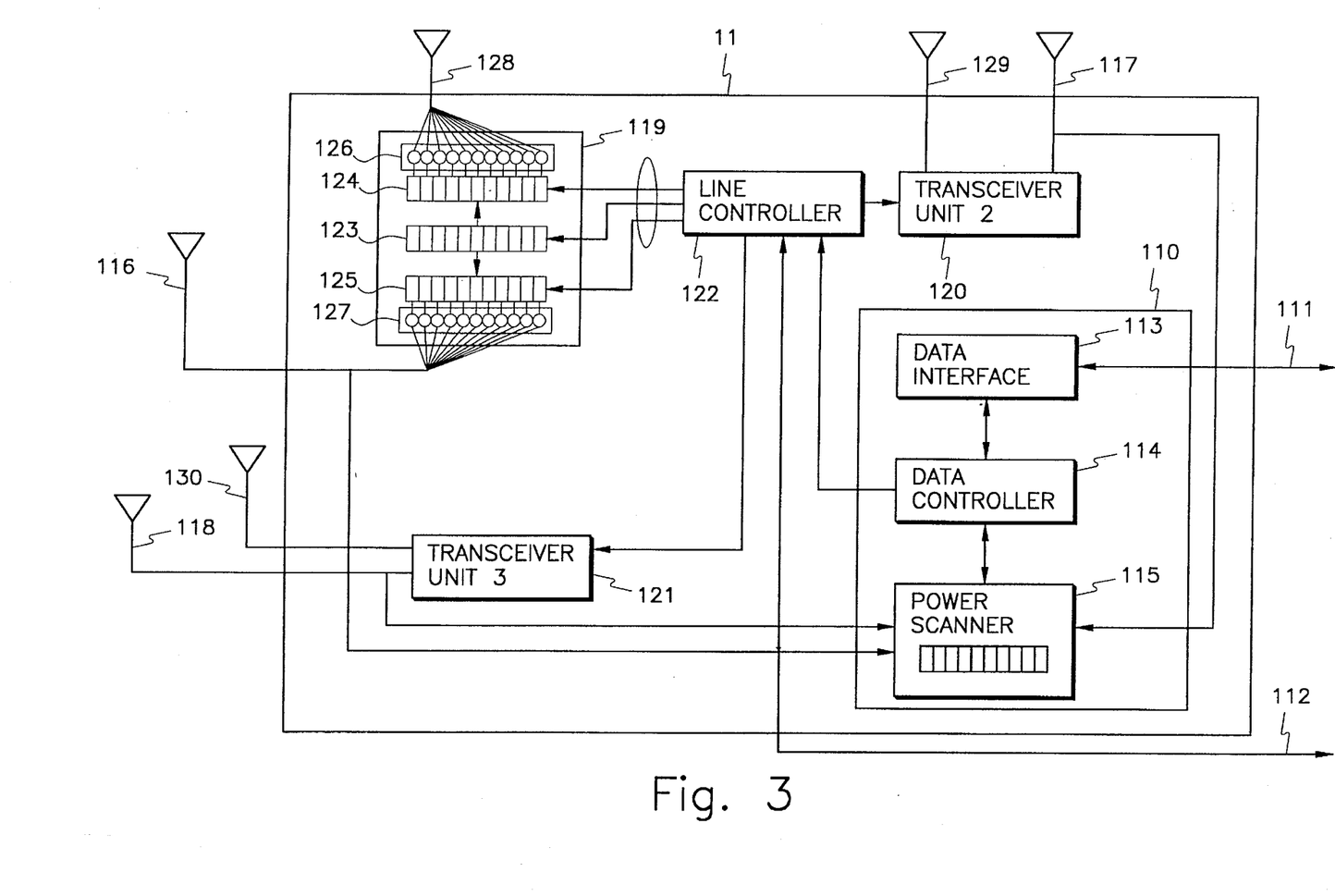
FIG. 3 is a block diagram of a base station in accordance with the subject invention.

FIG. 3 is a block diagram of the base station 11. Of course, the base stations 12–17 are similar to the base station 11 and will be readily understood by examination of the base station 11 alone. In later sections, the elements included in the base station 11 will be indicated as elements of other base stations 12–17 as needed to refer to the elements of the base stations 12–17.

The base station 11 is coupled to the MTSO 20 via data link 111 and voice trunks 112. The data link 111 and the voice trunks 112 serve to transmit control data and voice data, respectively, between the base station 11 and the MTSO 20. A data interface 113 receives control data such as instructions, from the data link 111 and converts this control information into a form suitable for data controller 114. The data interface 113 also converts control data such as measured signal strengths, received from the data controller 114 into a form suitable for transmission on the data link 111. The data controller 114 controls power scanner 115 which includes six power scanning units in FIG. 3 (of course, more or less scanning units can be used as needs require). Based on the control data (i.e., instructions) from the MTSO 20, the power scanner 115 tunes to selected frequencies of channels received by receiving antennas 116–118 of respective transceiver units 119–121. Because sectoring is used in the base stations 11–17 of FIG. 1, the base station 11 includes three transceiver units 119–121 for each of the sectors served by the base station 11. However, if the subject invention is used in a cellular system with no sectoring, the base station 11 would include only one transceiver unit with an omnidirectional antenna to serve the cell.

A line controller 122 is coupled to the voice trunks 112, the data controller 114, and the transceiver units 119–121. The line controller 122 sets-up and disconnects voice circuits in the transceiver units 119–121. Also, the line controller 111 transmits voice traffic between the MTSO 20 and the transceiver units 119–121.

In FIG. 3, the elements included in the transceiver unit 119 are shown. The other transceiver units 120, 121 include similar elements to those of the transceiver unit 119, so an explanation of the elements of transceiver units 120, 121 is omitted in the following description to avoid redundancy. The specific elements of the transceiver unit 119 include frequency synthesizers 123 coupled to respective transmitters 124 and receivers 125. The transmitters 124 and the receivers 125 are coupled to respective switches 126, 127. The switch 126 is coupled to transmitting antenna 128 and the switch 127 is coupled to receiving antenna 116. Like the transceiver unit 119, the transceiver units 120, 121 include respective transmitting antennas 129, 130.

The line controller 122 receives various instructions from the data controller 114 which are issued from the MTSO 20 via the data link 111 and the data interface 113. One type of instruction, an active mode (or call) set-up instruction, designates a channel and sector to be used to communicate in active mode with a mobile unit. This type of instruction instructs the line controller 122 to control a frequency synthesizer 123 for the transceiver unit serving the sector designated by the active mode instruction, to oscillate at the frequency used for the channel indicated in the active mode instruction. The line controller 122 then controls the frequency synthesizer 123 to modulate its signal. If TDMA channels are used, the line controller 122 modulates the signal generated by the frequency synthesizer 123 in the appropriate time slot indicated by the channel designation from the active mode instruction received from the MTSO 20.

The second type of instruction is the standby mode set-up instruction. In response to this instruction, the line controller 122 will perform all the tasks of an active mode set-up instruction, with the exception that the switch 119 for the transmitter 123 serving the call connection in standby mode, will be turned 'off' so that the base station will not transmit the signal to the mobile unit 40, but the receiver switch 127 for the receiver 125 serving the call in standby mode is 'on' so that the base station can receive signals from the mobile unit 40.

The third type of instruction is the 'switch mode' instruction. The line controller 122 will either turn the switch 119 'on' if the line controller 122 is instructed to switch from standby mode into active mode, or turn the switch 'off' if the line controller 122 is instructed to switch from active mode to standby mode.

Still another instruction issued by the MTSO 20 to the base stations 11–17 under certain circumstances, is the signal strength measurement instruction. The signal strength measurement instruction causes the data controller 114 to control the power scanner 115 to use one or more of its power scanning units to measure the signal strength(s) on a channel for one or more sectors (or cells if sectoring is not used) designated by the signal strength measurement instruction. The data controller 114 receives the measured signal strength(s) from the power scanner 115 and sends the measured signal strengths as control data to the MTSO 20 via the data interface 113 and the data link 111.

In addition, the base stations 11–17 will periodically measure the signal strengths of all the respective connections they currently serve and report that information to the MTSO 20. The MTSO 20 will use that information to decide whether a switch mode instruction will be issued to switch a transceiver unit 119–121 between active and standby modes. Worth noting is that in a TDMA system, this periodic power measurement may be performed by the mobile unit 40 during a time slot(s) other than the one used for conversation. The mobile unit 40 then sends the power measurement result to the active mode base station 11–17 which then relays this information to the MTSO 20.

4. The Mobile Telecommunications Switching Office (MTSO)

Figure 4A:
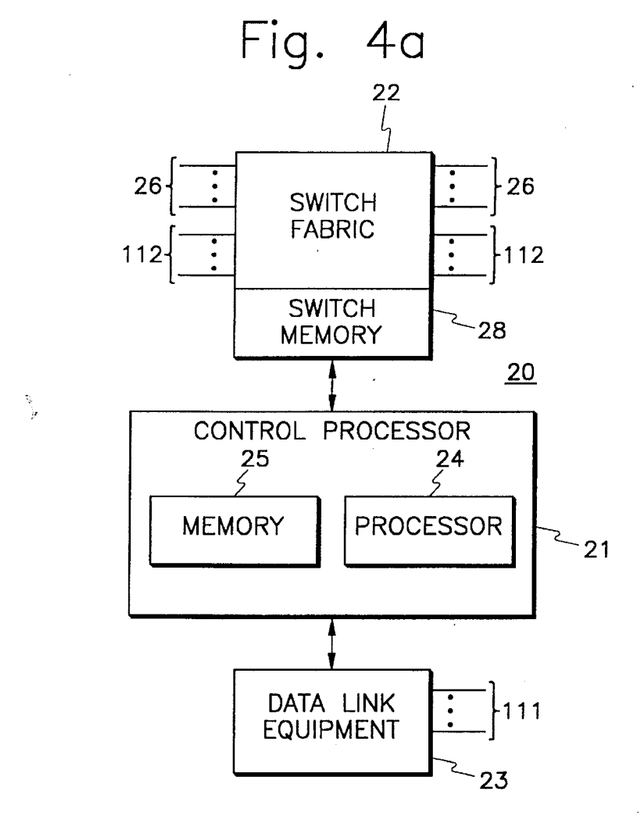
FIG. 4a is a block diagram of a mobile telecommunications switching office (MTSO) in accordance with the subject invention.

FIG. 4a is a block diagram of the MTSO 20 of FIG. 1. In FIG. 4a, the MTSO 20 includes control processor 21, switching fabric 22 and data link equipment 23. The control processor 21 includes a processor 24 and a memory 25. The memory 25 stores various data and control programs used by the processor 24 to generate control information for base stations 11–17 via the data link equipment 23, to set-up connections through the switching fabric 22, and to communicate with network 30 via trunks 26.

If a call originates from a mobile unit in the service area served by the MTSO 20, the control processor 21 receives a call number, request for service message, and sector identification data if sectoring is used. The control processor 21 refers to its memory 25 to determine a channel which is available and which would not violate a reuse distance requirement if used in the sector (or cell if sectoring is not used) requested. The control processor 21 then uses the processor 24 to compare the call number with data stored in the memory 25, to determine if the call number indicates that another mobile unit served by the MTSO 20 has been called, or that the called unit is served by the network 30 coupled to the trunks 26. If the call number indicates that a call connection is to be established with another mobile unit, the control processor 21 uses the processor 24 and the memory 25 to send a paging message to cells in which the called mobile unit is most likely to be found. Alternatively, the control processor 21 can use the processor 24 to broadcast the paging message to all cells served by the MTSO 20. If the called mobile unit responds to its unique paging message, the control processor 21 refers to its memory 25 to find an available voice channel which would not violate any reuse distance requirement, and sends the identity of this voice channel to the cell or sector receiving a request for service from the called mobile unit on the strongest set-up channel.

On the other hand, if the called unit is served by the network 30 of FIG. 1, the control processor 21 sends the call number and request for service to the network 30 via a trunk 26. The control processor 21 will also control the switching fabric 22 to connect the voice trunk 112 serving the voice channel, to the appropriate trunk 26 serving the network 30.

The MTSO 20 of the cellular system of the subject invention must have the capability to change its switching state more frequently than a conventional MTSO. This state information is usually stored in memory 28. Periodically, the MTSO 20 receives the signal strength reports from the active mode base station and the standby mode base station, serving the connection. If the standby mode base station has a signal strength stronger than that of the active mode base station, a switch mode instruction will be sent to the active mode and standby mode base stations. In the meantime, the connection state within the switch fabric 22 has to be updated accordingly.

Figures 4B, 4C:
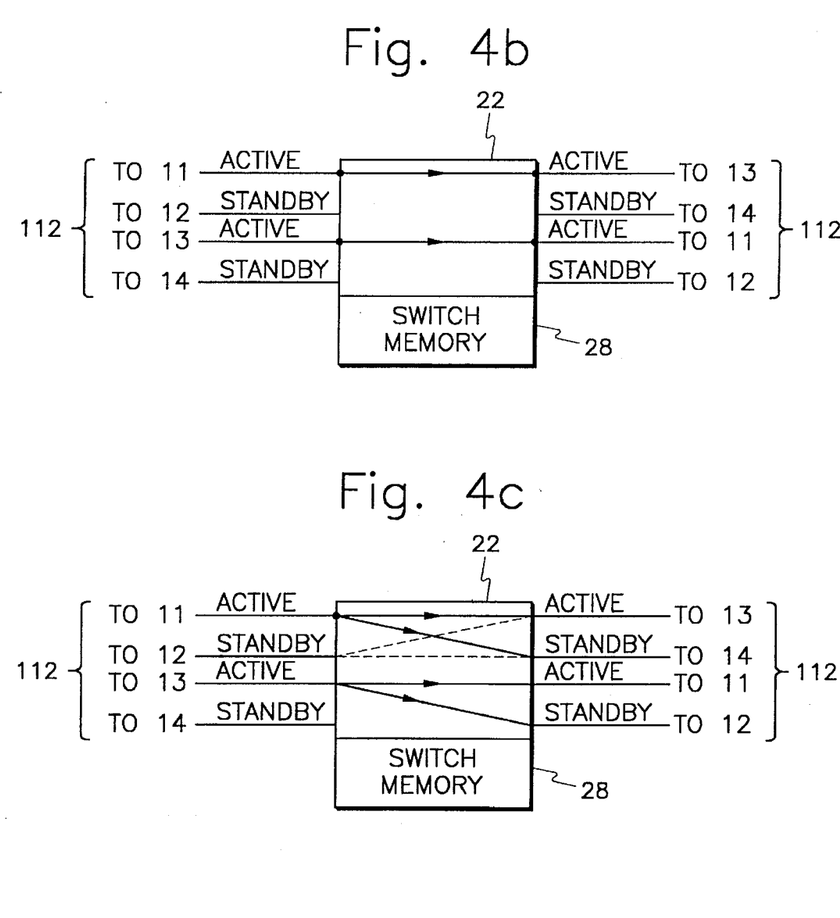
FIG. 4b is a diagram of the state of the switch fabric 22 for a first connection pattern in accordance with the subject invention.
FIG. 4c is a diagram of the state of the switch fabric 22 for a second connection pattern in accordance with the subject invention.

This is explained in FIGS. 4b and 4c where it is assumed that signals from base stations 11 and 12 for mobile unit 40 will be sent to base stations 13 and 14 which serve mobile unit 41. Two types of connections can be arranged. The first connection pattern is shown in FIG. 4b where the signal received from the active mode base station will be sent to the active mode base station serving mobile unit 41. In the second connection pattern of FIG. 4c, the signal received from the active mode station serving mobile unit 40 will be sent to both active mode and standby mode base stations serving mobile unit 41. This requires the MTSO 20 to have 1-to-2 multicast capability. Because the switch 126 in the standby mode base station is turned 'off', only the active mode base station will transmit the signal. If the switch mode function is left to the mobile unit (this is possible in a TDMA system, as previously explained, or an FDMA system with an additional receiver in the mobile unit), then the MTSO 20 can send the signal to active mode and standby mode base stations and let the mobile unit instruct which base station should be 'on' or 'off'. Thus, if the switch mode function is controlled by a mobile unit, only the second connection pattern of FIG. 4c can be used.

The control processor 21 receives the signal strength reports from the base stations 11–17. It then issues a switch mode instruction, using the processor 24 and the memory 25, to the base stations 11–17 if necessary. The control processor 21 also generates, using the processor 24 and the memory 25, a signal strength measurement instruction to a base station to locate an appropriate base station to serve a connection. In response to the signal strength measurement instruction, the base stations 11–17 that receive this instruction will measure the signal strength for the sector or cell and voice channel identified in the signal strength measurement instruction, and report the measured signal strength to the control processor 21 via the data link equipment 23 and a data link 111.

Additional call processing performed by the MTSO 20 primarily with the processor 24 and memory 25 of the control processor 21, will be apparent in the description of the methods of the subject invention described in sections 5 and 6 below.

5. Setting-Up and Disconnecting a Call Connection

The following description refers primarily to FIG. 5 to explain the setting-up of a call connection in accordance with the first method of the subject invention. The first method begins in step S1 of FIG. 5. As described previously, once power is supplied to the mobile unit 40 (i.e., the mobile unit 40 is 'on'), the mobile unit 40 will periodically scan a plurality of set-up channels and store the firstmost and secondmost strong set-up channels in its memory 47. Usually, each sector of a base station 11–17 has one set-up channel. When the user of the mobile unit 40 depresses appropriate keys 48 to initiate a call, the call number will be transmitted through the strongest set-up channel to the base station 11–17 associated with the strongest set-up channel (step S2 in FIG. 5). The mobile unit 40 also transmits to the base station 11–17 with the strongest set-up channel, the secondmost strong set-up channel information including the identity of the sector (or cell if sectoring is not used) with the secondmost strong set-up channel (step S2 of FIG. 5). This information is used by the MTSO 20 to determine the base station 11–17 and its sector (or cell) to serve the call connection, as the standby mode base station. In the present example, the sector 101 of the base station 11 is initially assumed to have the strongest set-up channel and the sector 200 of the base station 12 to have the secondmost strong set-up channel. The called number and the secondmost strong set-up channel information will be relayed by the base station 11 to the MTSO 20 through the high-speed data link 111 in FIG. 3.

The control processor 21 of the MTSO 20 determines whether an appropriate channel exists for the sector 101 of base station 11 and sector 200 of the base station 12 (step S3 of FIG. 5). For example, this determination is used to ensure that a reuse distance requirement would not be violated by using the channel in sectors 101 and 200. Because dynamic channel allocation is used in the subject invention, the probability that the MTSO 20 will be able to find an appropriate channel is relatively high. The MTSO 20 will then instruct the base stations 11 and 12 to set-up their transceivers and operation modes accordingly (step S4 of FIG. 5). If the MTSO 20 cannot find an appropriate channel, the call will be rejected (step S5 of FIG. 5).

The MTSO 20 determines the destination of the call, based on the call number (step S6 of FIG. 5). The destination can be a telephone or other unit reached through the network 30, or another mobile unit within the service area. If the call number indicates a telephone reached through the network 30, the MTSO 20 will forward the call number to the network 30 to set-up the call using the switch fabric 22 (step S7 of FIG. 5), and the setting-up of the call connection is completed (step S11 of FIG. 5). If the call number indicates that another mobile unit (for example, mobile unit 41 in FIG. 1) is the destination, the MTSO 20 sends a paging message either to a base station(s) 11–17 in which the mobile unit 41 is most likely to be found or to all of the base stations 11–17 (step S8 of FIG. 5). Those of the base stations 11–17 which receive the paging instruction from the MTSO 20 in turn send a paging message through a special paging channel to all mobile units in their respective cells. Upon receiving the paging message, the paged mobile unit 41 recognizes its unique paging message and will respond using the strongest set-up channel, assumed to be sector 401 of base station 14 in FIG. 1 of the present example (step S9 of FIG. 5). At the same time, the secondmost strong set-up channel information including the identity of the sector (or cell if sectoring is not used) assumed to be sector 302 of base 13 in the present example, will also be transmitted in a similar way to that described previously. The MTSO 20 then ensures that the use of the channel selected in step S3 of FIG. 5, would be appropriate in the firstmost and secondmost strong set-up channels as determined by the called mobile unit. For example, the use of the channel in the sectors (or cells) for the firstmost and secondmost strong set-up channels should not violate a reuse distance requirement stored as data in the memory 25. If the use of the channel selected in step S3 of FIG. 5 would not violate a reuse distance requirement, the MTSO 20 sets the switch fabric 22 to establish a call connection (step S10 of FIG. 5), and the setting-up of a call connection is completed (step S11 of FIG. 5).

Figure 6:
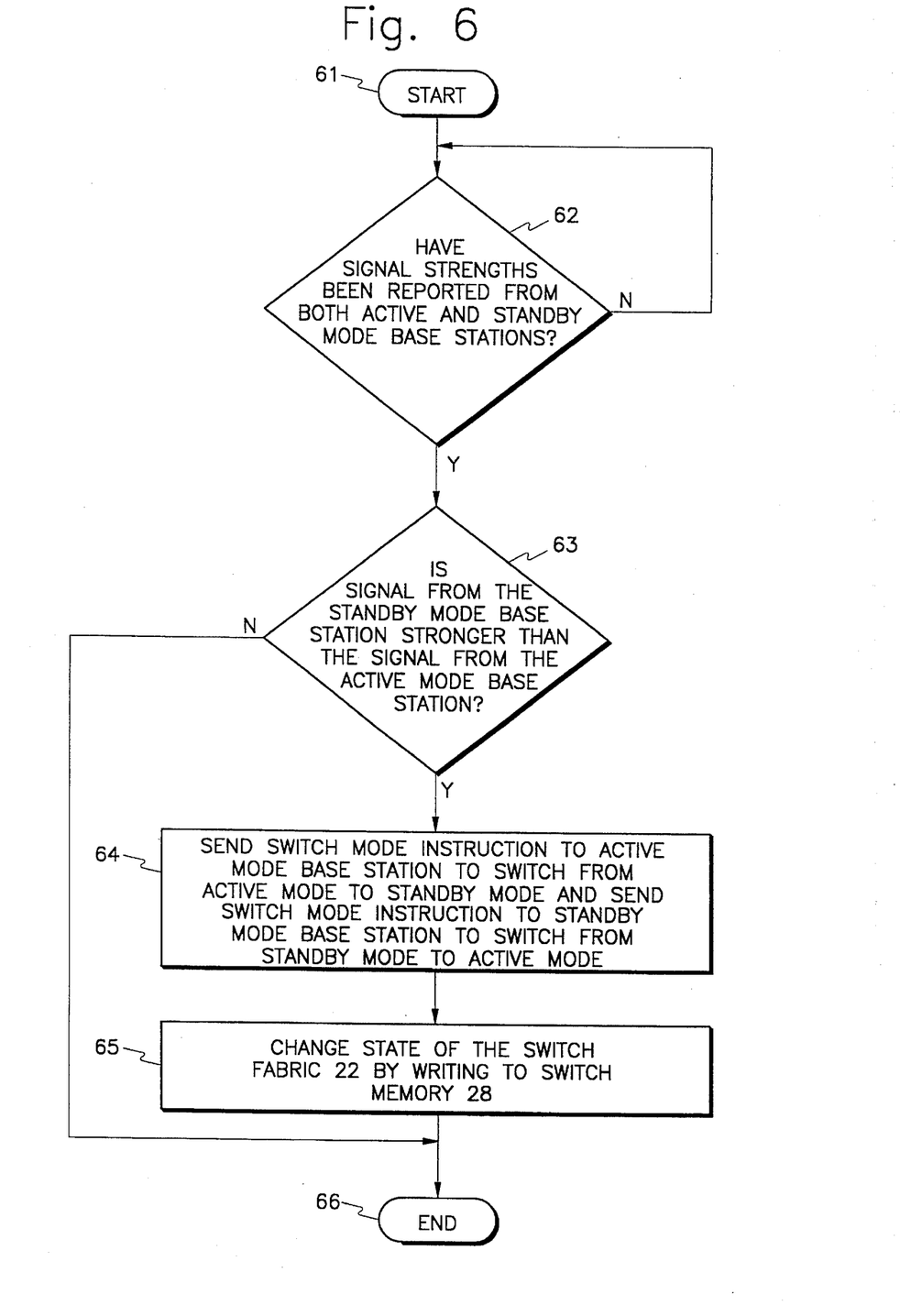
FIG. 6 is a flow chart of a method for switching as necessary an active mode base station to standby mode, and a standby mode base station to active mode, in accordance with the subject invention.

In FIG. 6, the second method of the subject invention can be performed by the MTSO 20 (specifically, the processor 24 under control of a control program stored in the memory 25). Alternatively, if a TDMA system is used, a mobile unit 40 (specifically, the processor 46 under control of a control program stored in the memory 47) can be used instead of the MTSO 20 to perform the second method of the subject invention in FIG. 6 (with the exception of step S5 which must be performed by the MTSO 20 under direction from the mobile unit 40). The second method of the subject invention is used to determine whether a base station(s) serving a call connection should be switched between active and standby modes.

The second method of the subject invention begins in step S1 of FIG. 6. In the midst of conversation, the MTSO 20 will periodically receive signal strength reports for all base stations 11–17 serving a call in standby or active mode (step S2 of FIG. 6). The MTSO 20 determines if the signal from the standby mode base station is stronger than the signal from the active mode base station (step S3 of FIG. 6). If so, the MTSO 20 sends a switch mode instruction to the active mode base station to switch from active mode to standby mode, and sends a switch mode instruction to the standby mode base station to switch from standby mode to active mode (step S4 of FIG. 6). The MTSO 20 also writes into the switch memory 28 to change the state of the switch fabric 22 (step S5 of FIG. 6) so that the connections are correctly set to account for the switching of the active and standby mode base stations. The processing performed by the MTSO 20 then ends in step S6 of FIG. 6 if no switching between active and standby modes was required in step S3 of FIG. 6, or if switching between active and standby modes was required in step S3 and performed in steps S5 and S6.

Returning to consideration of step S2 of FIG. 6, the base stations 11–17 preferably perform a signal strength measurement operation periodically under control of their respective data controllers 114 using power scanners 115. The measured signal strengths are then reported to the MTSO 20. Alternatively, the MTSO 20 can use a signal strength measurement instruction to direct the base stations 11–17 to measure and report signal strengths. If the mobile unit 40 or 41 performs the processing of FIG. 6 instead of the MTSO 20, the mobile unit 40 or 41 are themselves capable of obtaining signal strength measurements to perform step S2 of FIG. 6.

As a mobile unit with an established call connection moves in a service area, the cellular system of the subject invention periodically determines the base station best suited to serve the call in standby mode. This determination is performed by the MTSO 20 (specifically, the processor 24 under control of a control program stored in the memory 25) in the method of FIG. 7.

Figure 7:
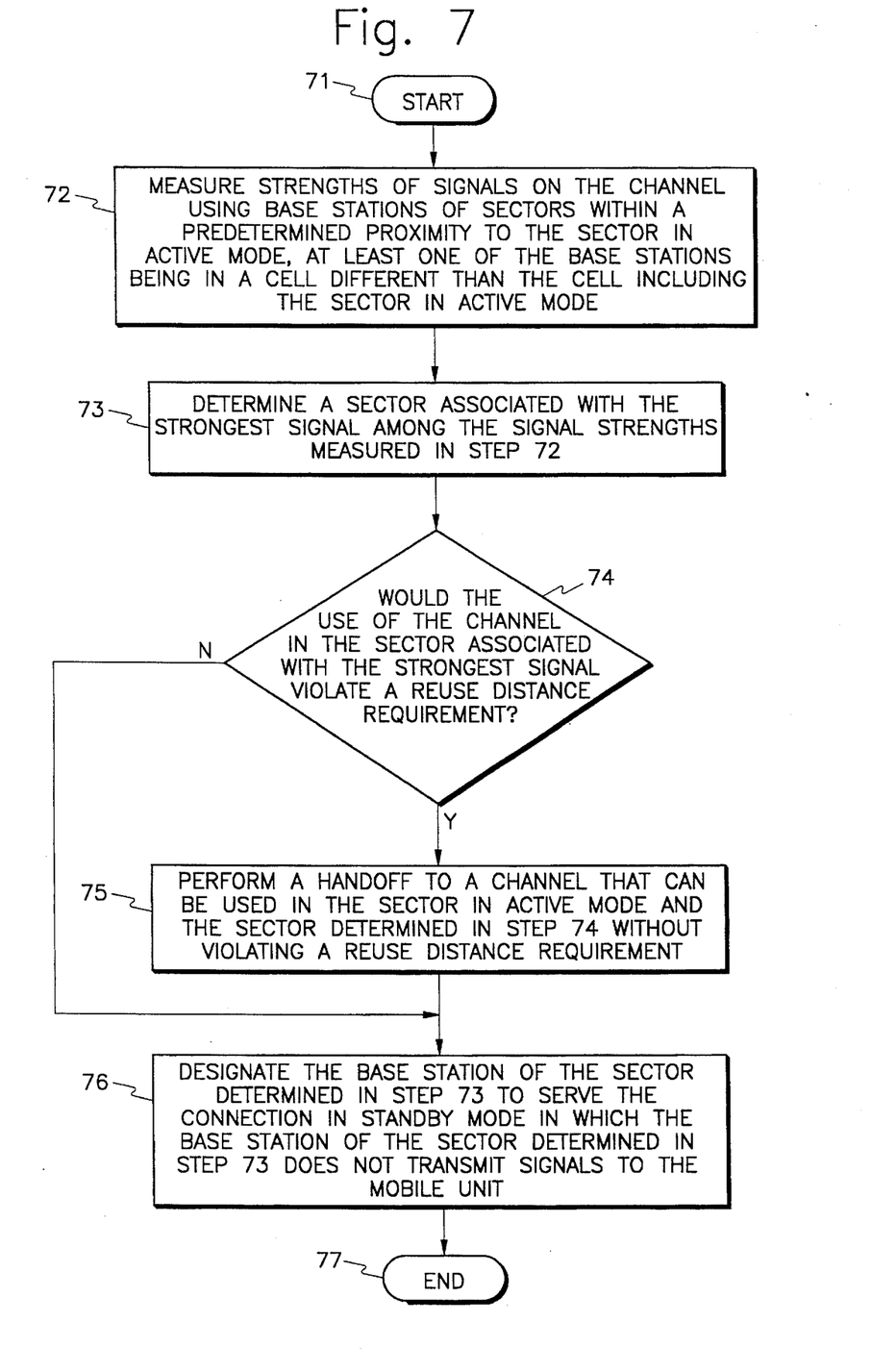
FIG. 7 is a flow chart of a method for determining a base station to serve a call connection in active or standby modes in accordance with the subject invention.

In step S1, processing for the method of FIG. 7 begins. The initiation of processing for the method of step S1 can result from a determination by the MTSO 20 that a signal strength for an active or a standby mode base station, is below a predetermined value, or can be performed periodically by the MTSO 20. In step S2 of FIG. 7, signal strengths are measured on a channel serving a call using base stations for sectors within a predetermined proximity to the sector in active mode. To perform step S2, the MTSO 20 can issue a signal strength measurement instruction to appropriate base stations, or the MTSO 20 can refer to signal strength measurement reports stored in its memory 25, that are received periodically from the base stations. In this signal strength measurement, at least one of the base stations is in a cell different from the cell including the sector in active mode. This ability to measure signal strengths for the radio connection in sectors of different cells is a unique feature of the subject invention made possible through the implementation of macro-diversity. In step S3 of FIG. 7, the sector associated with the strongest signal among the signal strengths measured in step S2, is determined. In step S4, a determination is made to determine whether the use of the channel in the sector associated with the strongest signal strength would violate a predetermined reuse distance requirement. This determination can be made, for example, by the MTSO 20 by referring to data stored in the memory 25 indicating the channels that can or cannot be used in each sector. If the determination in step S4 establishes that the channel cannot be used in the sector without violating a reuse distance requirement, a handoff in the traditional sense must be performed in step S5 of FIG. 7, after which processing proceeds to step S6. On the other hand, if the processing of step S4 of FIG. 7 determines that no handoff is required, the MTSO 20 designates the base station of the sector determined in step S3 to serve the call connection in standby mode in which the base station of the sector determined in step S3 does not transmit signals to the mobile unit with the established call connection. In step S7, the processing for the method of FIG. 7 ends.

Upon receiving a disconnect message indicating the termination of a call, the control processor 21 will instruct any of the base stations 11–17 serving the call to disconnect via the data link equipment 23 and the appropriate data link(s) 111. The control processor 21 will also control the switching fabric 22 to disconnect any of the voice trunks 112 or trunks 26 associated with the call connection. Also, the control processor 21 will update its memory 25 and memory 28 to indicate the availability of the voice channels that are disconnected.

Of course, a unit served by the network 30 can initiate a call to a mobile unit. In this situation, the processing is similar to that discussed above with respect to establishing a connection between the mobile unit 41, the base station 14 and the MTSO 20, except that the MTSO 20 will control the switching fabric 22 to connect an appropriate trunk 26 to a voice trunk 112, rather than connecting two voice trunks 112 together.

6. Variations

The devices, systems and methods of the subject invention can be varied or modified in a variety of ways without departing from the scope and spirit of the subject invention. For example, although the foregoing description has been described with cells using sectoring, the devices, systems and methods of the subject invention can be readily adapted for use with cells that do not use sectoring. Also, the devices, systems and methods of the subject invention can be adapted so that more than one cell or sector is designated to serve a call connection in standby mode. Further, the subject invention can be readily adapted to systems using more than one base station per cell. In addition, the cellular system of the subject invention can be modified such that only the active mode base station serves the connection with a mobile unit initially, and when a deterioration of signal strength is detected, through techniques previously described, the standby mode station is added to serve the connection. If signal strength for the connection improves above a predetermined level, the cellular system of the subject invention can revert to having the active mode base station serve the cell connection by itself after the standby mode base station is disconnected. All of these variations and modifications and any equivalents, are considered to be within the scope of the subject invention as set forth in the following claims.

I claim:

1. A cellular communication system comprising:

a plurality of base stations including respective transmitters coupled to respective frequency synthesizers serving respective cells that collectively define a service area, the base stations further including respective directional antennas coupled to the respective transmitters that serve sectors within respective cells;

a mobile unit moving in the service area, capable of communicating with the base stations; and a switch communicating with the base stations, the switch dynamically allocating channels to the base stations for use in respective sectors, the switch controlling at least first and second base stations of different cells to serve communication with the mobile unit in respective sectors on the same channel;

wherein at least two base stations report respective signal strengths for communication with the mobile unit, to the switch, the switch determines the firstmost and secondmost strong signal strengths among the reported signal strengths, the switch controls the first base station associated with the firstmost strong signal to serve communication with the mobile unit in active mode in which the frequency synthesizer of the first base station oscillates at the frequency of the channel and the transmitter of the first base station is activated to transmit signals on the channel to the mobile unit, and the switch controls the second base station associated with the secondmost strong signal to serve communication with the mobile unit in standby mode in which the frequency synthesizer of the second base station oscillates at the frequency of the channel but the transmitter of the second base station is not activated to transmit signals to the mobile unit.

2. A cellular communication system as claimed in claim 1, wherein the switch instructs the base stations to report respective signal strengths.

3. A cellular communication system as claimed in claim 1, wherein the base stations periodically report respective signal strengths.

4. A cellular communication system as claimed in claim 1, wherein:

the base stations report respective signal strengths for communication with the mobile unit, and as the mobile unit moves through the service area, the switch controls the substitution of base stations used as the first and second base stations that serve communication with the mobile unit using the same channel allocated to the original first and second base stations, based on the reported signal strengths.

5. A cellular communication system as claimed in claim 4, wherein the signal strengths are measured at the mobile unit and reported to the base stations.

6. A cellular communication system as claimed in claim 4, wherein the signal strengths are measured at the base stations.

7. A cellular communication system comprising:

a plurality of base stations including respective transmitters coupled to respective frequency synthesizers serving respective cells that collectively define a service area, the base stations further including respective directional antennas coupled to the respective transmitters that serve sectors within respective cells;

a mobile unit moving in the service area, capable of communicating with the base stations; and a switch communicating with the base stations, the switch dynamically allocating channels to the base stations for use in respective sectors, the switch controlling at least first and second case stations of different cells to serve communication with the mobile unit in respective sectors on the same channel;

wherein the first and second base stations report respective signal strengths for communication with the mobile unit, to the switch;

wherein the switch determines the base station associated with the strongest signal strength;

wherein the switch controls the one of the first and second base stations associated with the strongest signal strength to serve communication with the mobile unit in active mode in which the frequency synthesizer of the one of the base stations oscillates at the frequency of the channel and the transmitter of the one of the base stations is activated to transmit signals to the mobile unit; and wherein the switch controls the other of the first and second vase stations that is not associated with the strongest signal to serve communication with the mobile unit in standby mode in which the frequency synthesizer of the other of the first and second base stations oscillates at the frequency of the channel but the transmitter of the mobile unit is not activated to transmit signals for communication with the mobile unit.

8. A method comprising the steps of:

a) dividing a plurality of cells served by respective base stations, said base stations including respective transmitters coupled to respective frequency synthesizers serving respective cells that collectively define a service area, into sectors using directional antennas that limit signal propagation within the sectors;

b) dynamically allocating a channel for use in respective sectors served by at least two base stations in different cells, to serve communication with the mobile unit;

c) measuring strengths of signals transmitted between the base stations and the mobile unit in the sectors; and d) determining the sectors having the first most and secondmost strong signals from among the signals measured in said step (c); and wherein the channel in said step (b) is dynamically allocated to the two base stations for use in the sectors associated with the firstmost and secondmost strong signals in said step (d);

wherein said step (b) includes a substep of controlling the base station associated with the firstmost strong signal to serve communication with the mobile unit on the channel in an active mode in which the frequency synthesizer of the base station associated with the firstmost strong signal oscillates at a frequency of the channel and the transmitter of the base station is activated to transmit signals for communication with the mobile unit; and wherein said step (b) further includes a substep of controlling the base station associated with the secondmost strong signal to serve communication with the mobile unit on the channel in standby mode in which the frequency synthesizer of the base station associated with the secondmost strong signal strength oscillates at the frequency of the channel but the transmitter of the base station associated with the secondmost strong signal is not activated to transmit signals to the mobile unit.

9. A method as claimed in claim 8, further comprising the step of:

e) repeating said steps (c) and (d): and f) if the signal strength of the base station formerly associated with the secondmost strong signal strength exceeds the signal strength of the base station formerly associated with the firstmost strong signal strength, switching the base station formerly associated with the secondmost strong signal into the active mode and switching the base station formerly associated with the firstmost strong signal into the standy mode.

10. A cellular communication system comprising:

a plurality of base stations including respective transmitters coupled to respective frequency synthesizers serving respective cells that collectively define a service area, the base stations further including respective directional antennas coupled to the respective transmitters that serve sectors within respective cells;

a mobile unit moving in the service area, capable of communicating with the base stations; and a switch communicating with the base stations, the switch dynamically allocating channels to the base stations for use in respective sectors, the switch controlling at least first and second base stations of different cells to serve communication with the mobile unit in respective sectors on the same channel;

wherein at least two base stations report respective signal strengths for communication with the mobile unit, to the switch, the mobile unit determines the firstmost and secondmost strong signal strengths among the reported signal strengths, the switch controls the first base station associated with the firstmost strong signal to serve communication with the mobile unit in active mode in which the frequency synthesizer of the first base station oscillates at the frequency of the channel and the transmitter of the first base station is activated to transmit signals on the channel to the mobile unit, and the switch controls the second base station associated with the secondmost strong signal to serve communication with the mobile unit in standby mode in which the frequency synthesizer of the second base station oscillates at the frequency of the channel but the transmitter of the second base station is not activated to transmit signals to the mobile unit.

* * * * *

UNITED STATES PATENT AND TRADEMARK OFFICE
CERTIFICATE OF CORRECTION

PATENT NO. : 5,586,170
DATED : December 17, 1996
INVENTOR(S) : Chin-Tau Lea

Figure 5A:
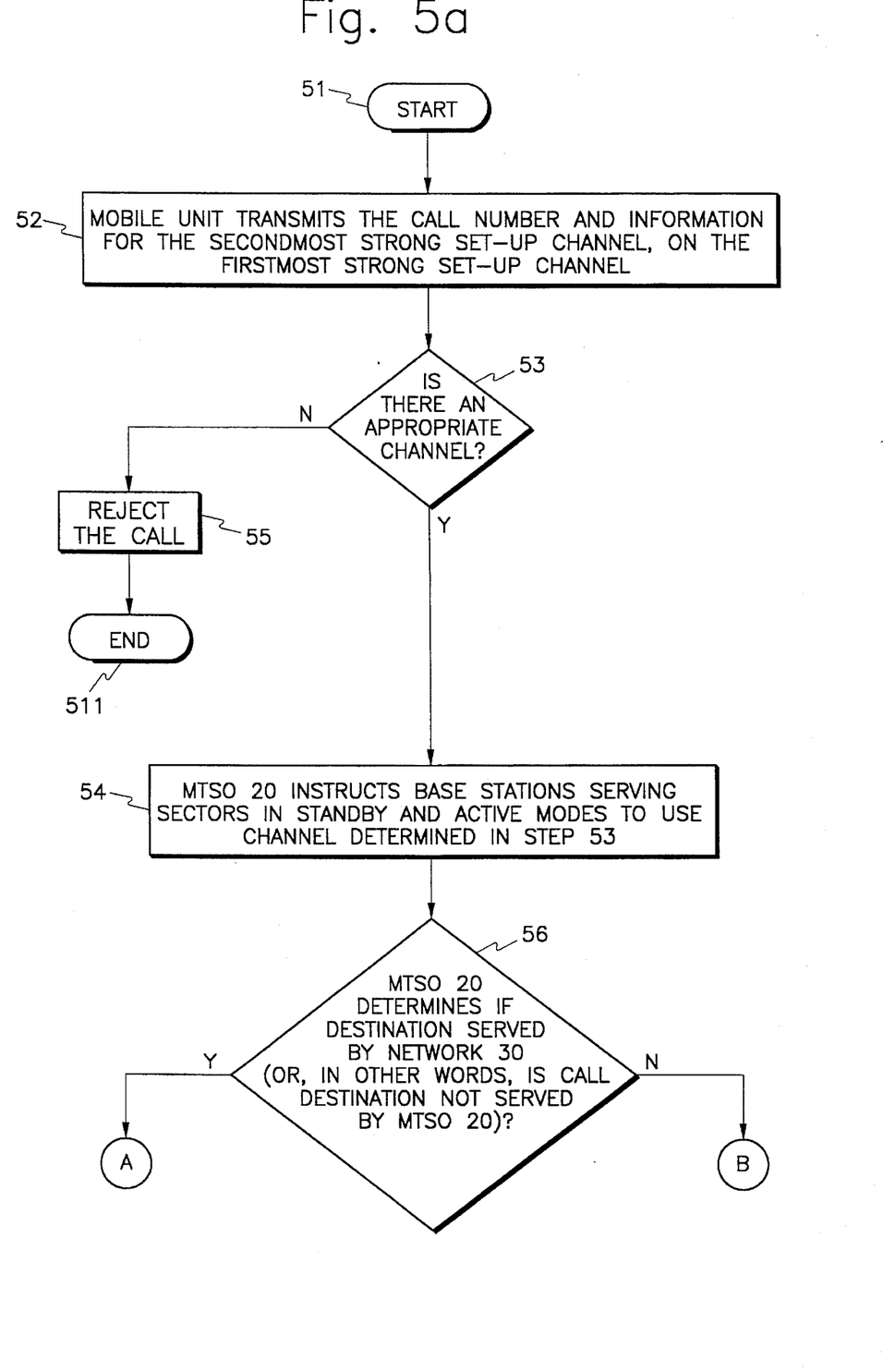
FIG. 5 is a flow chart of a method for setting-up a call connection in accordance with the subject invention.

It is certified that error appears in the above-indentified patent and that said Letters Patent is hereby corrected as shown below:

In the Drawing:

FIG. 5a:
"51" should be —S1—; "52" should be —S2—; "53" should be —S3—;
"55" should be —S5—; "511" should be —S11—; "54" should be —S4—;
"56" should be —S6—

Figure 5B:
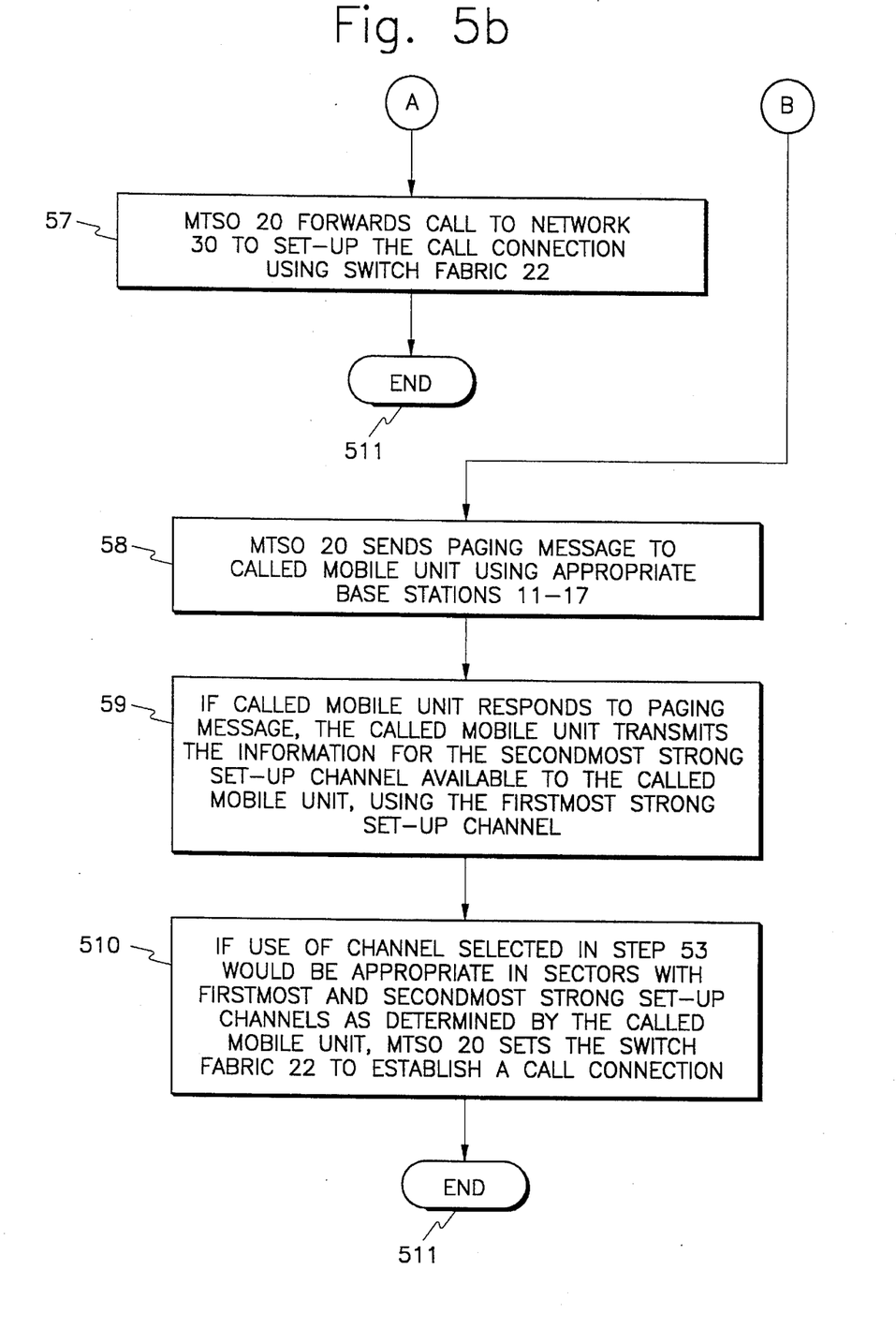

FIG. 5b:
"57" should be —S7—; "511" should be —S11—; "58" should be —S8—;
"59" should be —S9—; "510" should be —S10—; "53" should be —S3—;
"511" should be —S11—

FIG. 6:
"61" should be —S1—; "62" should be —S2—; "63" should be —S3—;
"64" should be —S4—; "65" should be —S5—; "66" should be —S6—

FIG. 7:
"71" should be —S1—; "72" should be —S2—; "73" should be —S3—;
"74" should be —S4—; "75" should be —S5—; "76" should be —S6—;
"77" should be —S7—

UNITED STATES PATENT AND TRADEMARK OFFICE
CERTIFICATE OF CORRECTION

PATENT NO. : 5,586,170
DATED : December 17, 1996
INVENTOR(S) : Chin-Tau Lea

It is certified that error appears in the above-indentified patent and that said Letters Patent is hereby corrected as shown below:

Column 10, line 42:
  "S5" should be —S4—; "S6" should be —S5—

Column 14, line 26:
  "standy" should be —standby—

Signed and Sealed this

Third Day of June, 1997

Attest:

BRUCE LEHMAN

Attesting Officer

Commissioner of Patents and Trademarks